(12) United States Patent
Chou et al.

(10) Patent No.: US 7,021,971 B2
(45) Date of Patent: Apr. 4, 2006

(54) DUAL-PERSONALITY EXTENDED-USB PLUG AND RECEPTACLE WITH PCI-EXPRESS OR SERIAL-AT-ATTACHMENT EXTENSIONS

(75) Inventors: Horng-Yee Chou, Palo Alto, CA (US); Ren-Kang Chiou, Fremont, CA (US); Ben Wei Chen, Fremont, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 21 days.

(21) Appl. No.: 10/708,172

(22) Filed: Feb. 12, 2004

(65) Prior Publication Data

US 2005/0059301 A1    Mar. 17, 2005

Related U.S. Application Data

(63) Continuation-in-part of application No. 10/605,146, filed on Sep. 11, 2003, now Pat. No. 6,854,984.

(51) Int. Cl.
*H01R 24/00* (2006.01)
(52) U.S. Cl. ............... 439/660; 439/218
(58) Field of Classification Search ............ 439/660, 439/608, 218, 607
See application file for complete search history.

(56) References Cited

U.S. PATENT DOCUMENTS

| | | | |
|---|---|---|---|
| 4,686,506 A | 8/1987 | Farago | 341/100 |
| 4,818,239 A | 4/1989 | Erk | 439/55 |
| 5,718,599 A * | 2/1998 | Ichikawa et al. | 439/404 |
| 5,766,033 A * | 6/1998 | Davis | 439/405 |
| 5,772,453 A | 6/1998 | Tan et al. | 439/79 |
| 6,089,879 A | 7/2000 | Babcock | 439/79 |
| 6,445,088 B1 | 9/2002 | Spitaels et al. | 307/66 |
| 6,554,648 B1 | 4/2003 | Shi et al. | 439/607 |
| 6,609,928 B1 | 8/2003 | Le | 439/541.5 |
| 6,659,805 B1 | 12/2003 | Siddiqui et al. | 439/668 |
| 2003/0154340 A1 | 8/2003 | Bolt et al. | 710/305 |
| 2003/0229748 A1 | 12/2003 | Brewer et al. | 710/305 |

* cited by examiner

*Primary Examiner*—Phuong Dinh
(74) *Attorney, Agent, or Firm*—Stuart T. Auvinen

(57) ABSTRACT

An extended Universal-Serial-Bus (USB) connector plug and socket each have a pin substrate with one surface that supports the four metal contact pins for the standard USB interface. An extension of the pin substrate carries another 8 extension metal contact pins that mate when both the connector plug and socket are extended. The extension can be an increased length of the plug's and socket's pin substrate or a reverse side of the substrate. Standard USB connectors do not make contact with the extension metal contacts that are recessed, retracted by a mechanical switch, or on the extension of the socket's pin substrate that a standard USB connector cannot reach. Standard USB sockets do not make contact with the extension metal contacts because the extended connector's extension contacts are recessed, or on the extension of the connector pin substrate that does not fit inside a standard USB socket.

12 Claims, 17 Drawing Sheets

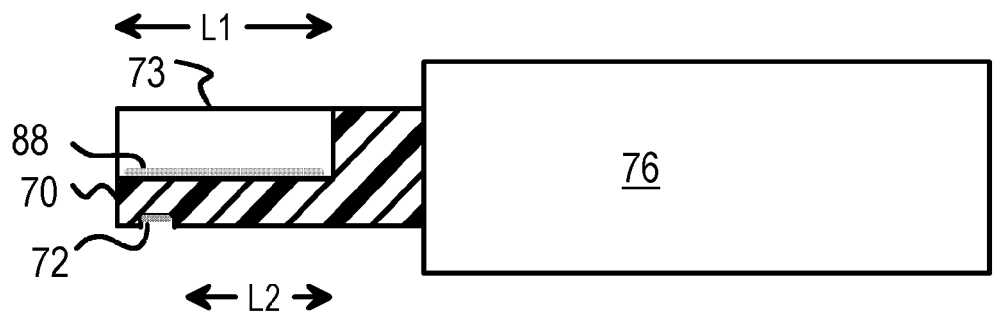
FIG. 4A
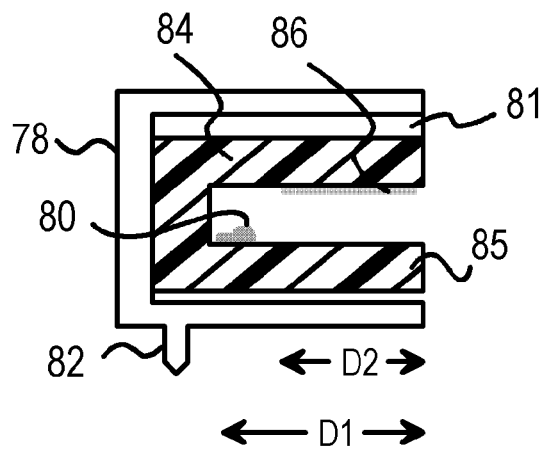
FIG. 4B
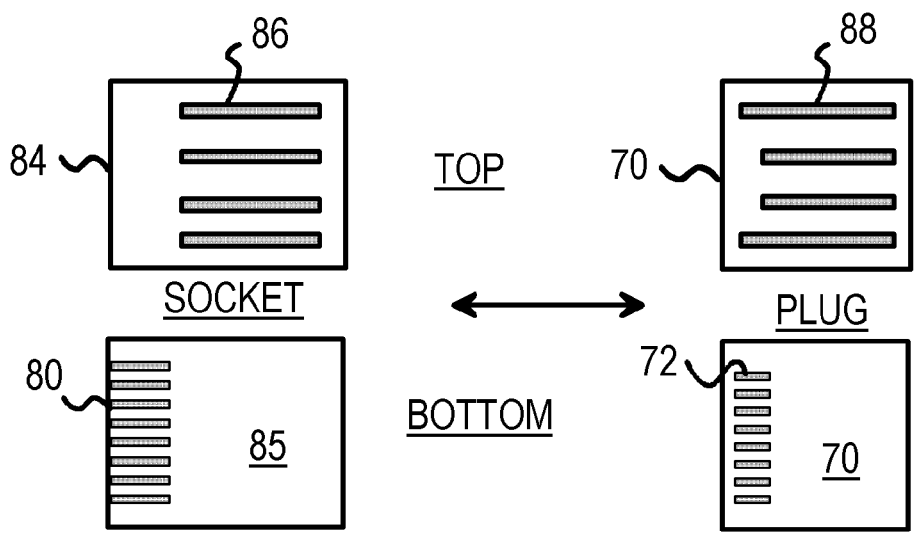
FIG. 4C
FIG. 4D

| SIDE | PIN-OUT | USB | PCI-EXPRESS | S-ATA | IEEE 1394 |
|---|---|---|---|---|---|
| A | 1 | 5V | 5V | 5V | 5V |
| A | 2 | D- | D- | D- | D- |
| A | 3 | D+ | D+ | D+ | D+ |
| A | 4 | GND | GND | GND | GND |
| B | 1 | | 3.3V | 3.3V | 3.3V |
| B | 2 | | 1.5V | N/C | N/C |
| B | 3 | | PETn | T- | TPB* |
| B | 4 | | PETp | T+ | TPB |
| B | 5 | | GND | GND | GND |
| B | 6 | | PERn | R- | TPA* |
| B | 7 | | PERp | R+ | TPA |
| B | 8 | | N/C | 12V | 12V |

DUAL-PERSONALITY EXTENDED-USB PLUG AND RECEPTACLE WITH PCI-EXPRESS OR SERIAL-AT-ATTACHMENT EXTENSIONS

CROSS REFERENCE TO RELATED APPLICATIONS

This application is a continuation-in-part of "Slim USB Connector with Spring-Engaging Depressions, Stabilizing Dividers and Wider End Rails for Flash-Memory Drive", U.S. Ser. No. 10/605,146, filed Sep. 11, 2003 now U.S. Pat. No. 6,854,984.

BACKGROUND OF INVENTION

This invention relates to serial-bus connectors, and more particularly to dual USB and PCI Express connectors.

Universal-Serial-Bus (USB) has been widely deployed as a standard bus for connecting peripherals such as digital cameras and music players to personal computers (PCs) and other devices. Currently, the top transfer rate of USB is 480 Mb/s, which is quite sufficient for most applications. Faster serial-bus interfaces are being introduced to address different requirements. PCI Express, at 2.5 Gb/s, and SATA, at 1.5 Gb/s and 3.0 Gb/s, are two examples of high-speed serial bus interfaces for the next generation devices, as are IEEE 1394 and Serial Attached Small-Computer System Interface (SCSI).

FIG. 1A shows a prior-art peripheral-side USB connector. USB connector 10 may be mounted on a board in the peripheral. USB connector 10 can be mounted in an opening in a plastic case (not shown) for the peripheral.

USB connector 10 contains a small connector substrate 14, which is often white ceramic, black rigid plastic, or another sturdy substrate. Connector substrate 14 has four or more metal contacts 16 formed thereon. Metal contacts 16 carry the USB signals generated or received by a controller chip in the peripheral. USB signals include power, ground, and serial differential data D+, D−.

USB connector 10 contains a metal case that wraps around connector substrate 14. The metal case touches connector substrate 14 on three of the sides of connector substrate 14. The top side of connector substrate 14, holding metal contacts 16, has a large gap to the top of the metal case. On the top and bottom of this metal wrap are formed holes 12. USB connector 10 is a male connector, such as a type-A USB connector.

FIG. 1B shows a female USB connector. Female USB connector 20 can be an integral part of a host or PC, or can be connected by a cable. Another connector substrate 22 contains four metal contacts 24 that make electrical contact with the four metal contacts 16 of the male USB connector 10 of FIG. 1A. Connector substrate 22 is wrapped by a metal case, but small gaps are between the metal case and connector substrate 22 on the lower three sides.

Locking is provided by metal springs 18 in the top and bottom of the metal case. When male USB connector 10 of FIG. 1A is flipped over and inserted into Female USB connector 20 of FIG. 1B, metal springs 18 lock into holes 12 of male USB connector 10. This allows the metal casings to be connected together and grounded.

Universal-Serial-Bus (USB) is a widely used serial-interface standard for connecting external devices to a host such as a personal computer (PC). Another new standard is PCI Express, which is an extension of Peripheral Component Interconnect (PCI) bus widely used inside a PC for connecting plug-in expansion cards. An intent of PCI Express is to preserve and re-use PCI software. Unfortunately, USB connectors with their 4 metal contacts do not support the more complex PCI Express standard.

FIGS. 2A–B show an ExpressCard and its connector. A new removable-card form-factor known as ExpressCard has been developed by the Personal-Computer Memory Card International Association (PCMCIA), PCI, and USB standards groups. ExpressCard 26 is about 75 mm long, 34 mm wide, and 5 mm thick and has ExpressCard connector 28.

FIG. 2B shows that ExpressCard connector 28 fits into connector or socket 30 on a host when ExpressCard 26 is inserted into an ExpressCard slot on the host. Since ExpressCard connector 28 and socket 30 are 26-pin connectors, they contain many more signals than a 4-pin USB connector. The additional PCI-Express interface can be supported as well as USB. ExpressCard 26 can also use USB to communicate with the host. Differential USB data signals USBD+ and USBD− are connected between ExpressCard 26 and a host chip set. The host chip set contains a USB host controller to facilitate communication with ExpressCard 26.

PCI Express supports data rates up to 2.5 G/b, much higher than USB. While the ExpressCard standard is useful for its higher possible data rate, the 26-pin connectors and wider card-like form factor limit the use of ExpressCards. The smaller USB connector and socket are more desirable than the larger ExpressCard.

Another interface, serial AT-attachment (SATA) supports data rates of 1.5 Gb/s and 3.0 Gb/s. However, SATA uses two connectors, one 7-pin connector for signals and another 15-pin connector for power. Due to its clumsiness, SATA is more useful for internal storage expansion than for external peripherals.

While SATA and ExpressCard are much higher-speed interfaces than USB, they use larger, bulky connectors while USB has a single, small connector.

FIGS. 3A–D shows cross-sections of a prior-art USB connector and socket. In FIG. 3A, a prior-art peripheral-side plug or USB connector has plastic housing 36 that the user can grip when inserting the USB connector into a USB socket such as the socket in FIG. 3B. Pin substrate 34 can be made of ceramic, plastic, or other insulating material, and supports metal contact pins 32. There are 4 metal contact pins 32 arranged as shown in the top view of pin substrate 34 in FIG. 3D. Metal cover 33 is an open-ended rectangular tube that wraps around pin substrate 34 and the gap above metal contact pins 32.

In FIG. 3B, a prior-art host-side USB socket is shown, such as a USB socket on a host PC. Metal cover 38 is rectangular tube that surrounds pin substrate 42 and has an opening to receive the USB connector's pin substrate 34. Metal contact pins 44 are mounted on the underside of pin substrate 42. Mounting pin 40 is formed from metal cover 38 and is useful for mounting the USB socket to a printed-circuit board (PCB) or chassis on the host PC.

Metal contact pins 44 are arranged as shown in the bottom view of pin substrate 42 of FIG. 3C. The four metal contact pins 44 are arranged to slide along and make contact with the four metal contact pins 32 when the USB connector is inserted into the USB socket. Pin substrates 34, 42 are formed in an L-shape with matching cutouts above metal contact pins 32 and below metal contact pins 44 that fit together when inserted.

Metal contact pins 32, 44 can have a slight bend or kink in them (not shown) to improve mechanical and electrical contact. The bend produces a spring-like action that is compressed when the USB connecter is inserted into the USB socket. The force of the compressed spring improves contact between metal contact pins 32, 44.

While useful, prior-art USB sockets and connectors have only four metal contact pins 32 that mate with four metal contact pins 44. The four metal contact pins carry power, ground, and differential data lines D+, D−. There are no additional pins for extended signals required by other standard buses, such as PCI Express or Serial ATA.

What is desired is an extended USB socket and connector. An extended-USB connector that fits into standard USB sockets, yet has additional metal contacts is desirable. An extended-USB socket that can receive a standard USB connector or the extended USB connector is also desired. The extended socket and connector when mated carry additional signals, allowing for higher-speed bus interfaces to be used. A higher-speed extended connector and socket that are physically and electrically compatible with existing USB sockets and connector is desirable. Auto-detection of higher-speed capabilities is desired when the extended USB connector is plugged into the extended USB socket.

BRIEF DESCRIPTION OF DRAWINGS

FIGS. 4A–I show a first embodiment of extended USB connectors and sockets having metal contact pins on both top and bottom surfaces of the pin substrates.
FIG. 10 is a table of extended and standard pins in the extended USB connector and socket.

DETAILED DESCRIPTION

The present invention relates to an improvement in serial-bus connectors and sockets. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that USB connectors and sockets are widely deployed. An extended or enhanced USB connector must fit in standard USB sockets, and an enhanced USB socket must accept standard USB connectors for backward compatibility. Since the height and width of USB connectors/sockets must remain the same for insertion compatibility, the length of each can be extended to fit additional metal contacts for additional signals.

The inventors have also realized that additional metal contacts may be placed on the opposite side of the pin substrates, opposite the existing four metal contact pins. These additional pins must not touch the metal housing or metal cover to prevent shorting to ground when the metal cover is grounded.

Extended-Length Substrate with Pins on Two Sides—FIG. 4

Figure 4E:
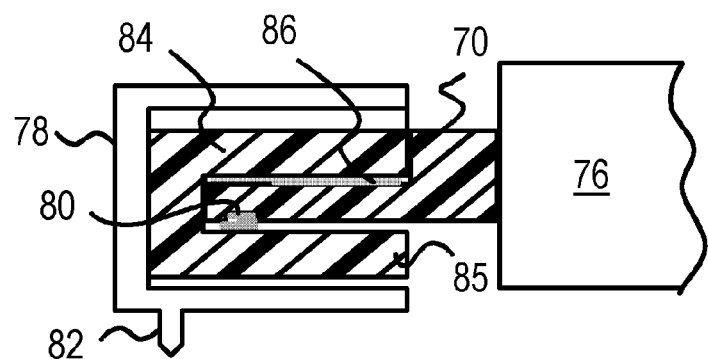

FIGS. 4A–I show a first embodiment of extended USB connectors and sockets having metal contact pins on both top and bottom surfaces of the pin substrates. In FIG. 4A, the extended connector has plastic housing 76 that the user can grip when inserting the connector plug into a socket. Pin substrate 70 supports metal contact pins 88 on the top surface. Pin substrate 70 is an insulator such as ceramic, plastic, or other material. Metal leads or wires can pass through pin substrate 70 to connect metal contact pins 88 to wires inside plastic housing 76 that connect to the peripheral device.

Reverse-side metal contact pins 72 are placed in a recess in the bottom side of pin substrate 70 near the tip of the connector plug. Ribs can be added alongside contact pins 72 to further prevent shorting. Reverse-side metal contact pins 72 are additional pins for extended signals such as for PCI-Express signals. Metal leads or wires can pass through pin substrate 70 to connect reverse-side metal contact pins 72 to wires inside plastic housing 76 that connect to the peripheral device.

Figure 1A:
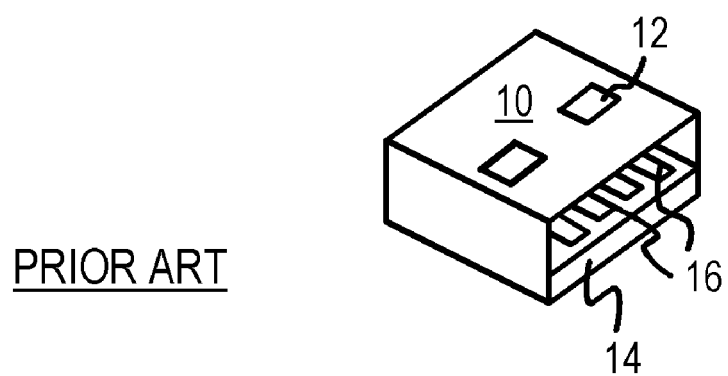
FIG. 1A shows a prior-art peripheral-side USB connector.
Figure 1B:
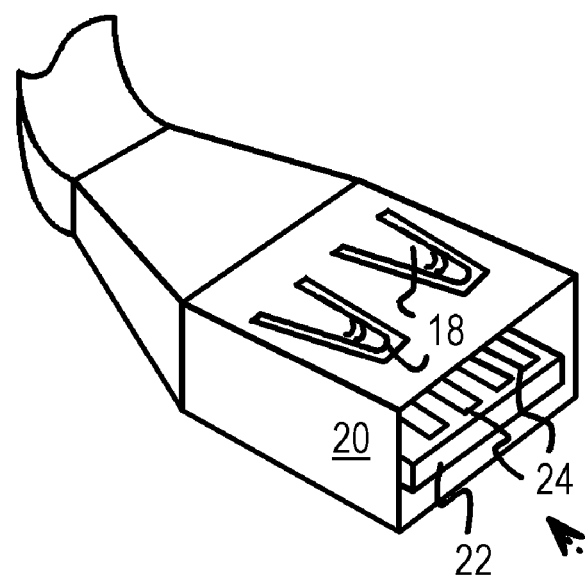
FIG. 1B shows a female USB connector.
Figure 2A:
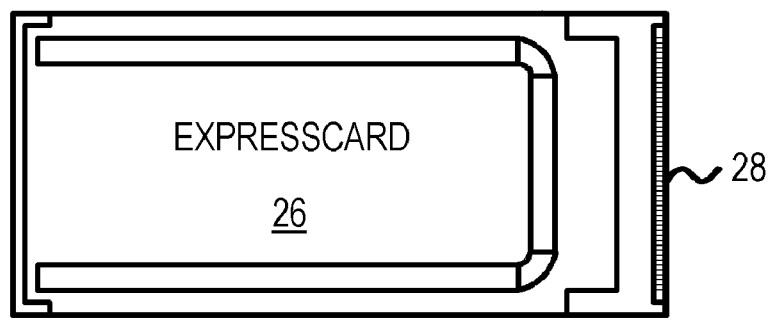
FIGS. 2A–B show an ExpressCard and its connector.
Figure 2B:
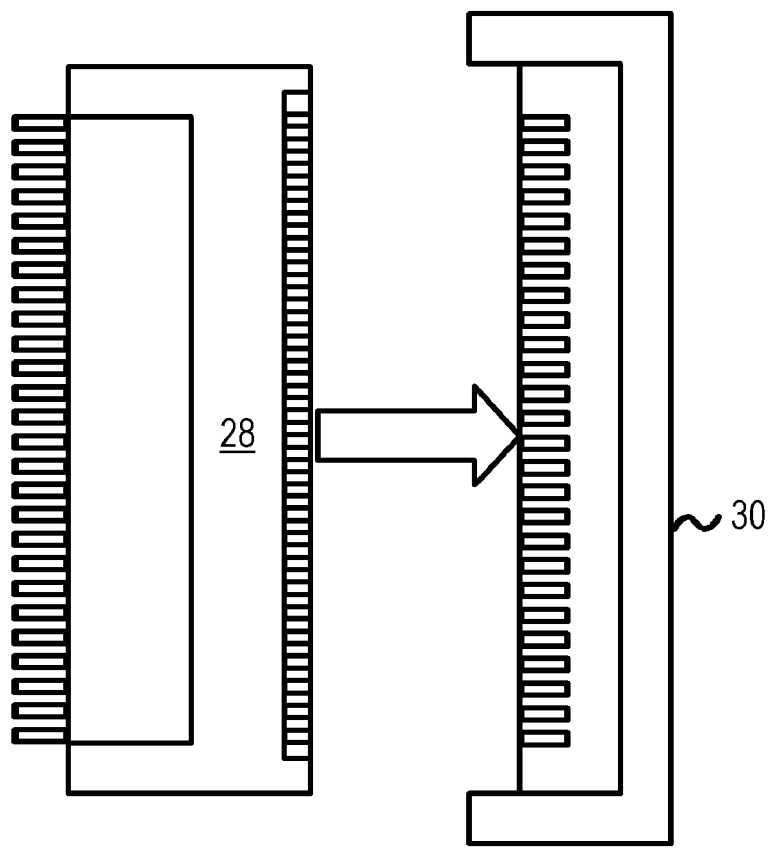
Figure 3A:
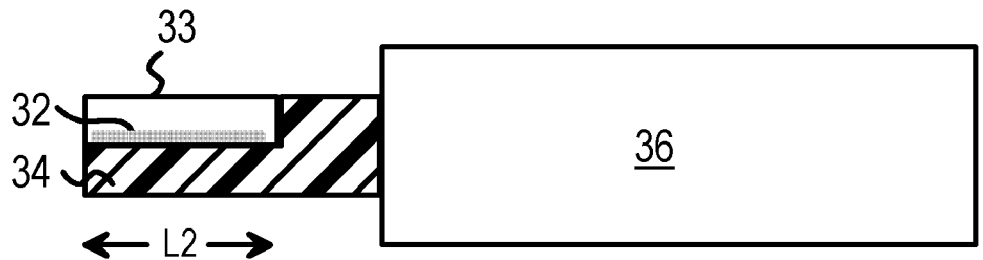
FIGS. 3A–D shows cross-sections of a prior-art USB connector and socket.

The length L1 of pin substrate 70 is longer than the length L2 of pin substrate 34 in the prior-art USB connector of FIG. 3A. The extension in length (L1–L2) can be 2–5 millimeters. Reverse-side metal contact pins 72 are located mostly in the extension region beyond L2. Metal cover 73 is a rectangular tube that surrounds pin substrate 70 and has an open end. An opening in metal cover 73 on the bottom of pin substrate 70 allows reverse-side metal contact pins 72 to be exposed.

FIG. 4B shows an extended-USB socket having metal contact pins on both bottom and top surfaces of the pin substrate. Pin substrate 84 has metal contact pins 86 formed on a bottom surface facing a cavity that pin substrate 70 of the connector fits into. Pin substrate 84 also has lower substrate extension 85 that is not present on the prior-art USB socket, which has an L-shaped pin substrate.

Extension metal contact pins 80 are mounted on lower substrate extension 85 near the rear of the cavity. A bump or spring can be formed on extension metal contact pins 80, such as by bending flat metal pads. This bump allows extension metal contact pins 80 to reach reverse-side metal contact pins 72 which are recessed in pin substrate 70 of the connector.

Figure 3B:
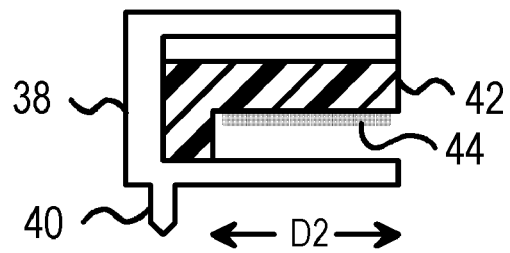
Figures 3C, 3D:
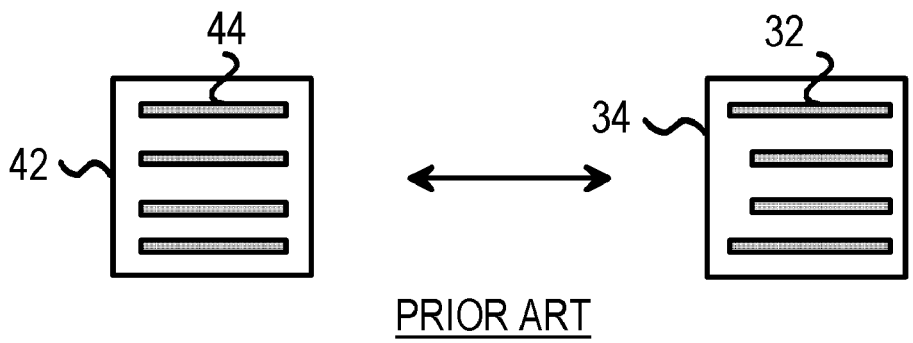

A cavity is formed by the bottom surface of pin substrate 84 and the top surface of lower substrate extension 85 and the back of pin substrate 84 than connects to lower substrate extension 85. The depth D1 of this cavity is greater than the depth D2 of the prior-art USB socket of FIG. 3B. This extended depth allows for a standard, prior-art USB connector to be inserted into the cavity and not make electrical contact with extension metal contact pins 80, preventing shorting. Metal cover 78 is a metal tube that covers pin substrate 84 and lower substrate extension 85. Metal cover 73 of the USB connector fits in gaps 81 between metal cover 78 and the top and sides of pin substrate 84. Mounting pin 82 can be formed on metal cover 78 for mounting the extended USB socket to a PCB or chassis.

FIG. 4C shows the bottom surface of pin substrate 84, which supports metal contact pins 86. These four pins carry the prior-art USB differential signals, power, and ground, and make contact with metal contact pins 88 of the extended USB connector on the top surface of pin substrate 70, shown in FIG. 4D.

The extended USB connector has 8 reverse-side metal contact pins 72 on the bottom surface of pin substrate 70, arranged as shown in FIG. 4D. These make contact with extension metal contact pins 80, arranged as shown in FIG. 4C on lower substrate extension 85. These 8 extension pins carry extended signals, such as for PCI-Express.

FIG. 4E shows the extended USB connector fully inserted into the extended USB socket. When fully inserted, the tip of pin substrate 70 fits into the cavity between pin substrate 84 and lower substrate extension 85 of the extended USB socket. On the upper surface of connector pin substrate 70, metal contact pins 88 make contact with the four metal contact pins 86 of socket pin substrate 84, while reverse-side metal contact pins 72 on the bottom surface of pin substrate 70 make contact with extension metal contact pins 80 on the top surface of lower substrate extension 85.

Since reverse-side metal contact pins 72 are recessed, they do not make contact with metal cover 38 of the prior-art USB socket. Ribs can be added near contact pins 72 to further prevent shorting. This prevents shorting of signals connected to reverse-side metal contact pins 72 to a ground connected to metal cover 38.

Figure 4F:
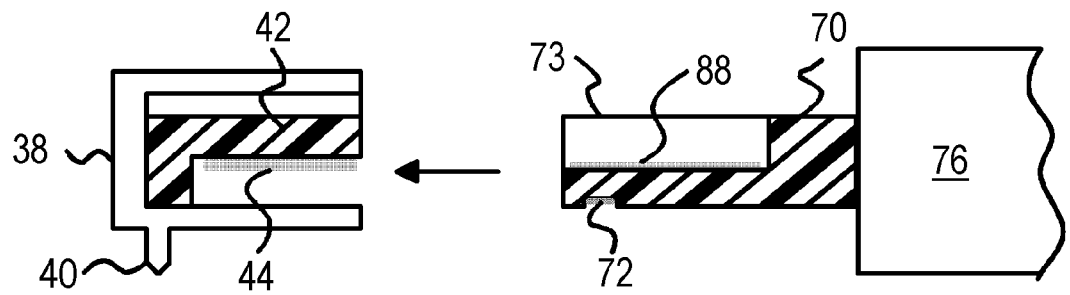
Figure 4G:
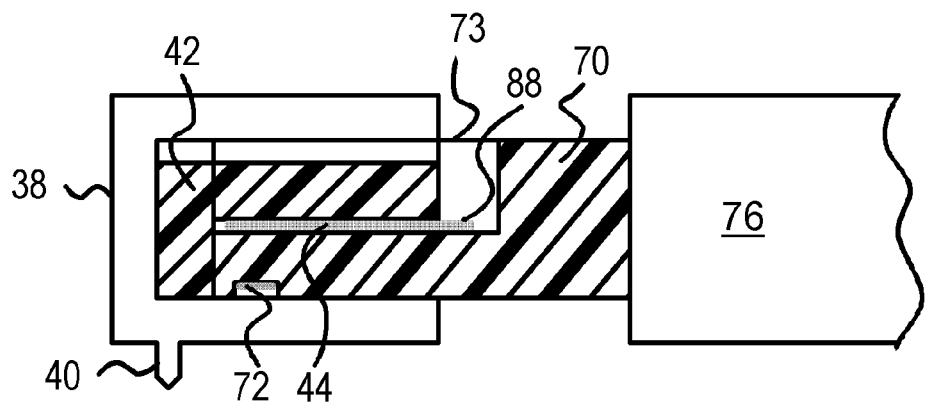

FIG. 4F shows the extended USB connector just before insertion into a standard USB socket. When fully inserted, as shown in FIG. 4G, the tip of pin substrate 70 fits under socket pin substrate 42. On the upper surface of connector pin substrate 70, metal contact pins 88 make contact with the four metal contact pins 44 of socket pin substrate 42. Reverse-side metal contact pins 72 on the bottom surface of pin substrate 70 do not make contact with socket metal cover 38 since reverse-side metal contact pins 72 are recessed into the bottom surface of connector pin substrate 70 or when insulating ribs are provided. Thus only the four standard USB pins (metal contact pins 44, 88) are electrically contacted.

Figure 4H:
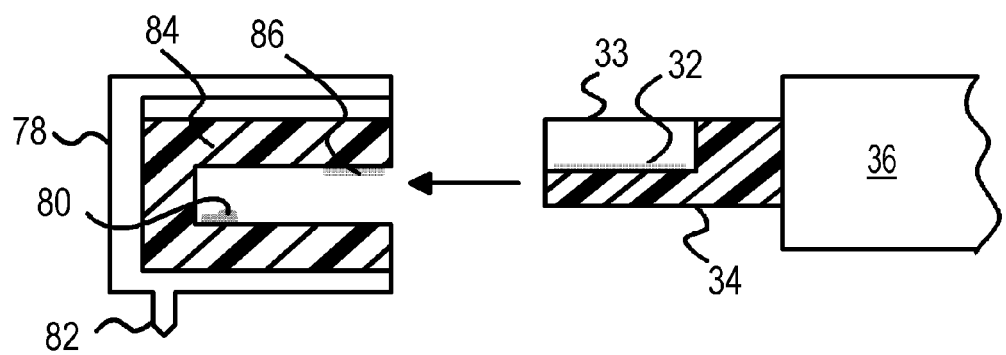
Figure 4I:
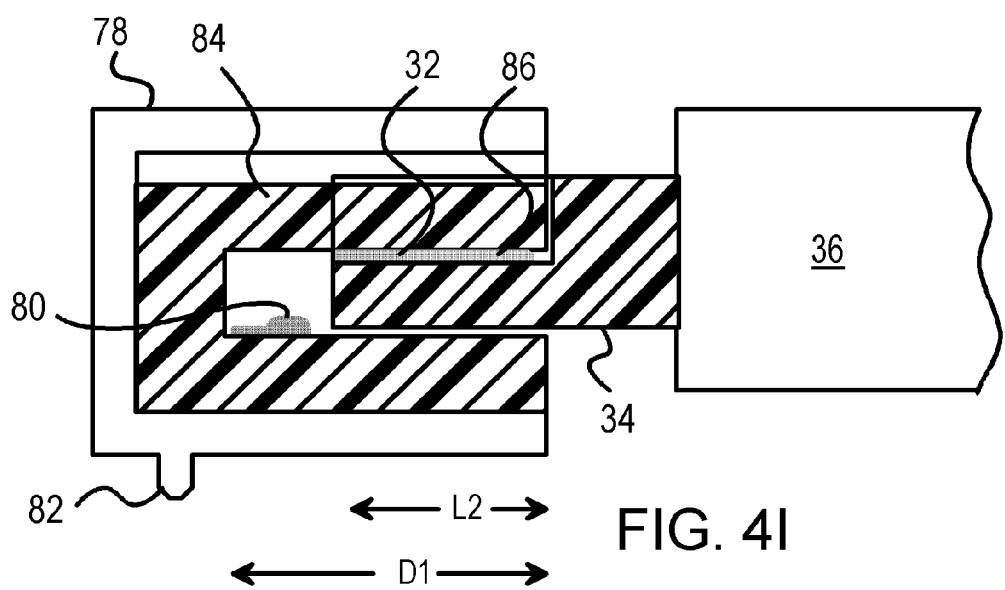

FIG. 4H shows a standard USB connector just before insertion into the extended USB socket. When fully inserted, as shown in FIG. 4I, the tip of connector pin substrate 34 fits under socket pin substrate 84, but does not reach the back of the cavity. On the upper surface of connector pin substrate 34, metal contact pins 32 make contact with the four metal contact pins 86 of socket pin substrate 84. Extension metal contact pins 80 on the top of lower substrate extension 85 do not touch connector metal cover 33 since the depth of the extended USB socket is greater than the length L2 of the prior-art USB connector. Thus only the four standard USB pins (metal contact pins 32, 86) are electrically contacted.

Extended-Length Substrate with Pins on Same Side—FIG. 5

Figure 5A:
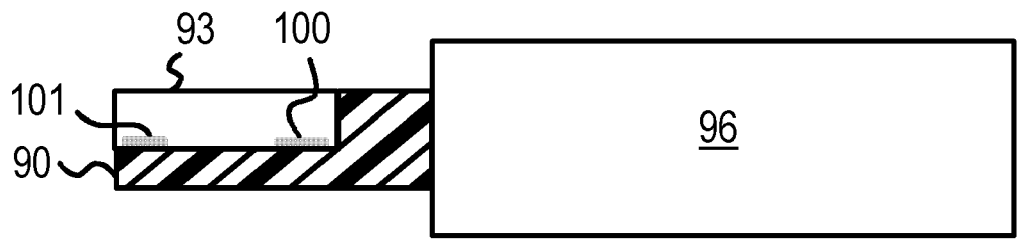
FIGS. 5A–H show a second embodiment of extended USB connectors and sockets having metal contact pins on just one of the surfaces of the pin substrates.

FIGS. 5A–H show a second embodiment of extended USB connectors and sockets having metal contact pins on just one of the surfaces of the pin substrates. In FIG. 5A, the extended connector has plastic housing 96 that the user can grip when inserting the connector plug into a socket. Pin substrate 90 supports metal contact pins 100, 101 on the top surface. Pin substrate 90 is an insulator such as ceramic, plastic, or other material. Metal leads or wires can pass through pin substrate 90 to connect metal contact pins 100, 101 to wires inside plastic housing 96 that connect to the peripheral device.

The length of pin substrate 90 is longer than the length L2 of pin substrate 34 in the prior-art USB connector of FIG. 3A. The extension in length can be 2–5 millimeters. Tip-end metal contact pins 101 are located mostly in the extension region beyond L2. Metal cover 93 is a rectangular tube that surrounds pin substrate 90 and has an open end.

Figure 5B:
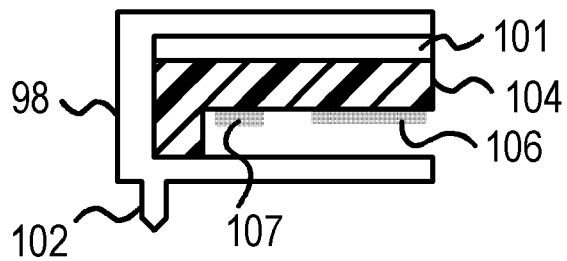

FIG. 5B shows an extended-USB socket having metal contact pins on just one of the surfaces of the pin substrate. Pin substrate 104 has metal contact pins 106, 107 formed on a bottom surface facing a cavity that pin substrate 90 of the connector fits into. Pin substrate 104 does not need the lower substrate extension of FIGS. 4, 6, but can have the L-shape as shown.

Metal cover 98 is a metal tube that covers pin substrate 104 and the opening underneath. Metal cover 93 of the USB connector fits in gaps 101 between metal cover 98 and the top and sides of pin substrate 104. Mounting pin 102 can be formed on metal cover 98 for mounting the extended USB socket to a PCB or chassis.

Figures 5C, 5D:
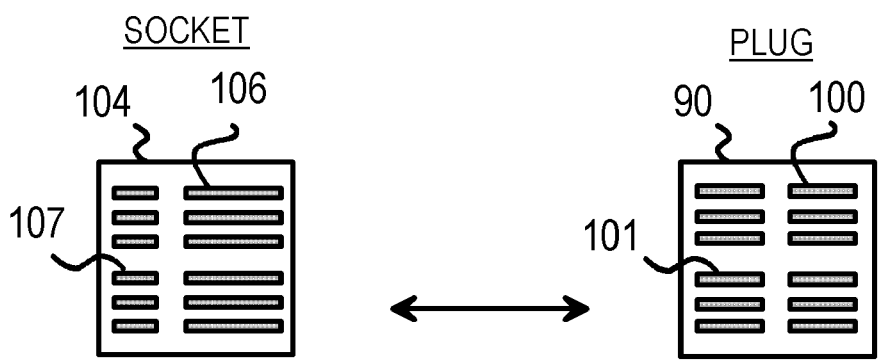

FIG. 5C shows the bottom surface of socket pin substrate 104, which supports metal contact pins 106, 107. Primary metal contact pins 106 are in a first row of 6 pins that are closest to the socket opening. Secondary metal contact pins 107 are in a second row of 6 pins that are farthest from the socket opening.

Primary metal contact pins 106 include the four USB pins, which are the 1st, 3rd, 4th, and 6th of the 6 pins. The prior-art USB pins are made narrower to allow the additional 2 pins to be inserted between the 1st and 3rd, and the 4th and 6th pins. Also, the prior-art USB pins have a narrower spacing between the center pins than the outside pins. Thus there is slightly more room for inserting an extension pin between the two pairs of outer USB pins than the two middle USB pins.

The 1st and 3rd, and the 4th and 6th pins of primary metal contact pins 106 carry the prior-art power, USB differential signals, and ground, and make contact with the corresponding 1st and 3rd, and the 4th and 6th pins of metal contact pins 100 of the extended USB connector on the top surface of pin substrate 90, shown in FIG. 5D.

Two of the extension signals are carried by the 2nd and 5th pins of primary metal contact pins 106 that make contact with the 2nd and 5th pins of metal contact pins 100. The other 6 extension signals are carried by the second row of pins, secondary metal contact pins 107, which make contact with metal contact pins 101 of the plug. These 8 extension pins carry extended signals, such as for PCI-Express.

When the extended USB connector is fully inserted into the extended USB socket, the tip of pin substrate 90 fits into the cavity under pin substrate 104 of the extended USB socket. On the upper surface of connector pin substrate 90, metal contact pins 100 make contact with the six primary metal contact pins 106 of socket pin substrate 104, and metal contact pins 101 at the tip of the top surface of pin substrate 90 make contact with secondary extension metal contact pins 107 on the downward-facing surface of pin substrate 104.

Figure 5E:
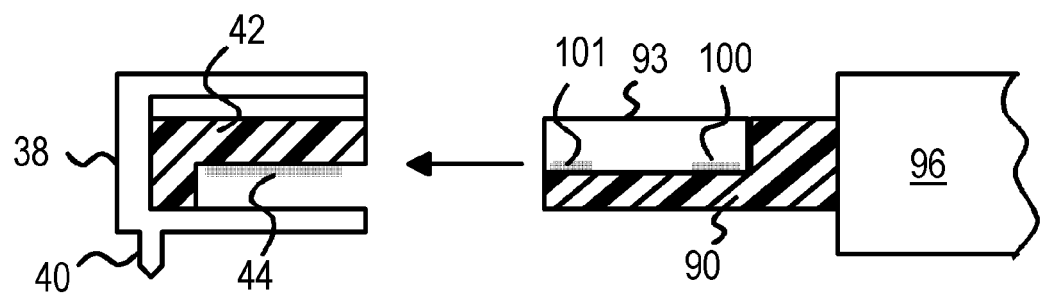
Figure 5F:
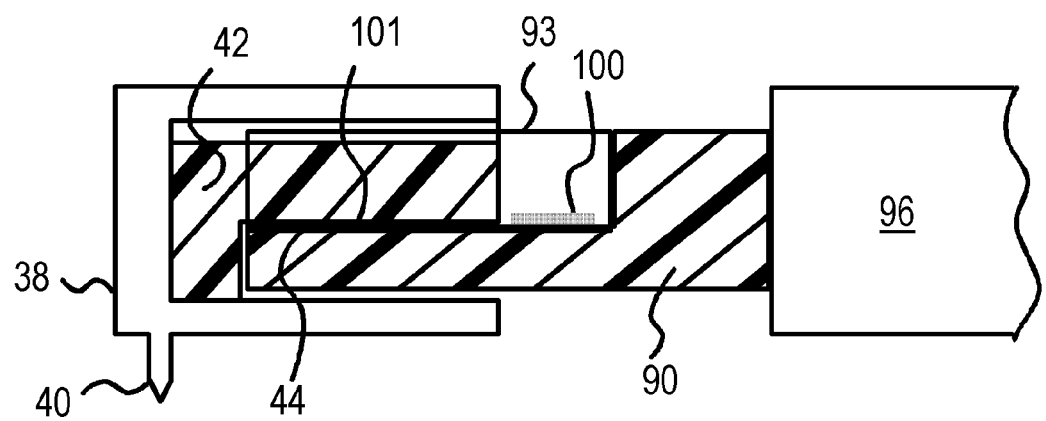

FIG. 5E shows the extended USB connector just before insertion into a standard USB socket. When fully inserted, as shown in FIG. 5F, the tip of pin substrate 90 fits under socket pin substrate 42. On the upper surface of connector pin substrate 90, the 1st, 3rd, 4th, and 6th of tip-end metal contact pins 101 make contact with the four USB metal contact pins 44 of socket pin substrate 42. The back-end row of metal contact pins 100 on the top surface of pin substrate 90 do not make contact with socket metal cover 38 or any metal contacts since they are too far back on connector pin substrate 90. Thus only the four standard USB pins (metal contact pins 44, 101) are electrically contacted.

Figure 5G:
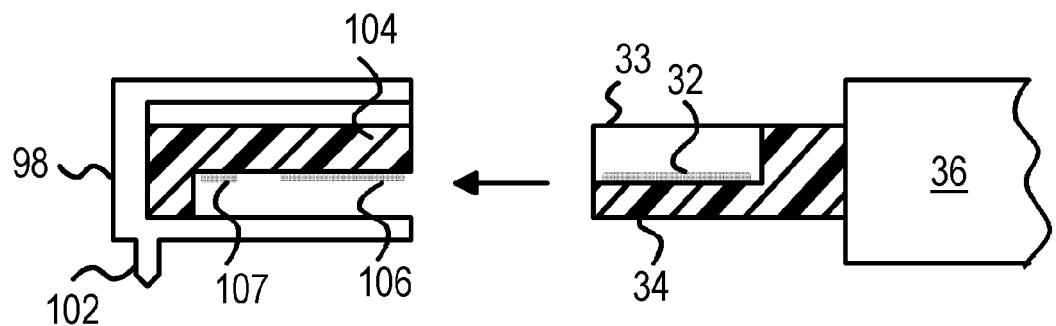
Figure 5H:
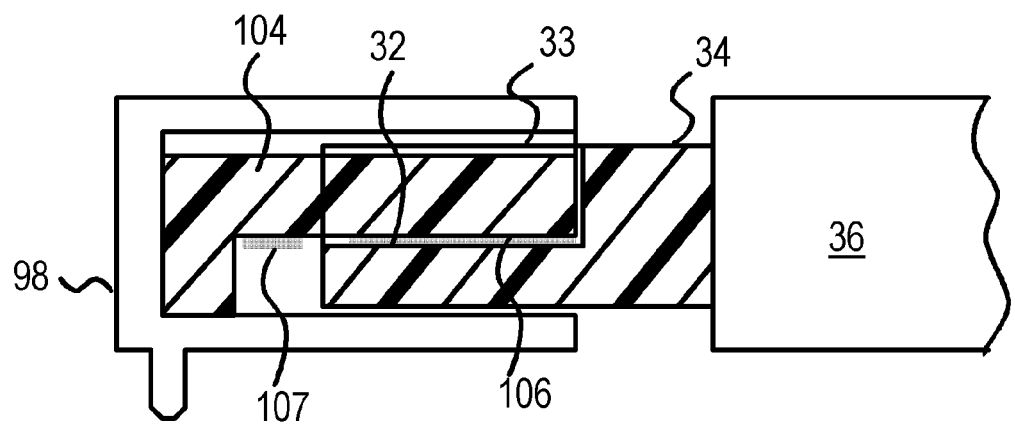

FIG. 5G shows a standard USB connector just before insertion into the extended USB socket. When fully inserted, as shown in FIG. 5H, the tip of connector pin substrate 34 fits under socket pin substrate 104, but does not reach the back of the socket cavity. On the upper surface of connector pin substrate 34, metal contact pins 32 make contact with the 1st, 3rd, 4th, and 6th of the six primary metal contact pins 106 of socket pin substrate 104. Secondary metal contact pins 107 on substrate 104 do not touch connector metal cover 33 since the depth of the extended USB socket is greater than the length L2 of the prior-art USB connector. Thus only the four standard USB pins (metal contact pins 32, 106) are electrically contacted. The extended USB connector and socket are electrically and mechanically compatible with standard prior-art USB sockets and connectors.

Pivoting Extension Pins—FIG. 6

FIGS. 6A–H show a third embodiment of extended-function USB connectors and sockets using extended pins on a pivoting substrate attached to the socket's pin substrate. The length and depth do not have to be extended in this embodiment, or can be extended less than the embodiments of FIGS. 4, 5.

Figure 6A:
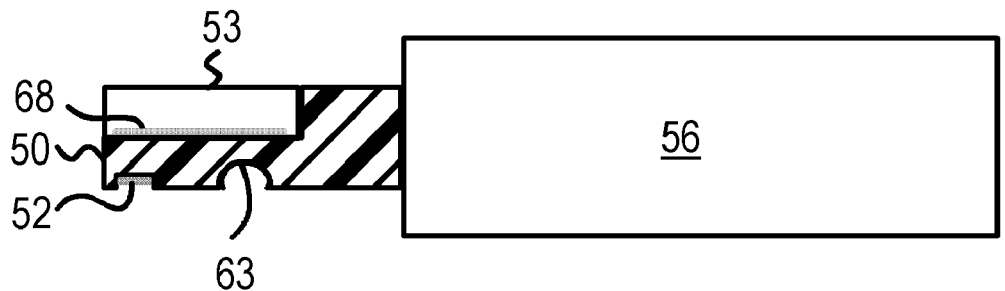
FIGS. 6A–H show a third embodiment of extended-function USB connectors and sockets using extended pins on a pivoting substrate attached to the socket's pin substrate.

In FIG. 6A, the connector has plastic housing 56 that the user can grip when inserting the connector plug into a socket. Pin substrate 50 supports metal contact pins 68 on the top surface. Pin substrate 50 is an insulator such as ceramic, plastic, or other material. Metal leads or wires can pass through pin substrate 50 to connect metal contact pins 68 to wires inside plastic housing 56 that connect to the peripheral device.

Reverse-side metal contact pins 52 are placed in a recess in the bottom side of pin substrate 50 near the tip of the connector plug and can have raised ribs on each side to prevent contact with the spring-like clips on the metal cover of the standard USB socket. Reverse-side metal contact pins 52 are additional pins for extended signals such as for PCI-Express signals. Metal leads or wires can pass through pin substrate 50 to connect reverse-side metal contact pins 52 to wires inside plastic housing 56 that connect to the peripheral device.

The length of pin substrate 50 can be the same as the length L2 of pin substrate 34 in the prior-art USB connector of FIG. 3A, or can be slightly longer. Reverse-side metal contact pins 52 are located near the tip of the connector plug. Hole or notch 63 is also provided on the reverse-side, but farther back from the tip of the plug. Two notches 63 can be provided as shown in FIG. 6D (plug, bottom view).

Metal cover 53 is a rectangular tube that surrounds pin substrate 50 and has an open end. A large opening or several smaller openings in metal cover 53 on the bottom of pin substrate 50 allows reverse-side metal contact pins 52 and notches 63 to be exposed.

Figure 6B:
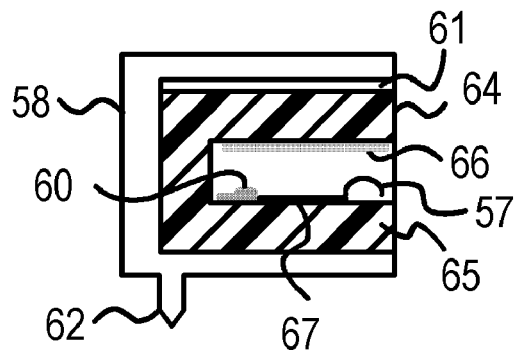
Figures 6C, 6D:
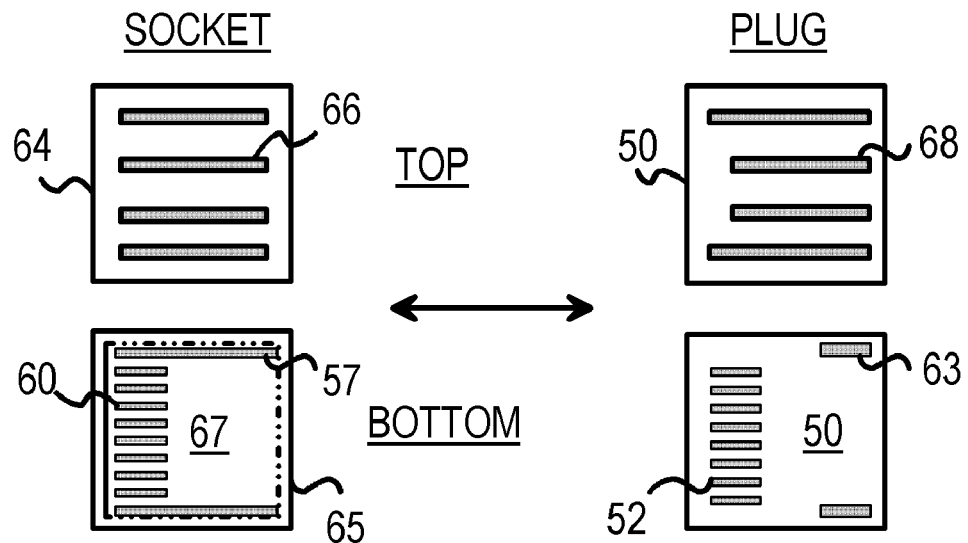

FIG. 6B shows an extended-USB socket having retractable metal contact pins on the lower surface of the pin substrate. Pin substrate 64 has metal contact pins 66 formed on a cavity-top surface facing downward to a cavity that pin substrate 50 of the connector fits into. Pin substrate 64 also has lower substrate extension 65 that is not present on the prior-art USB socket, which has an L-shaped pin substrate.

Extension metal contact pins 60 are mounted on lower substrate extension 65 near the rear of the cavity. A bump or spring can be formed on extension metal contact pins 60, such as by bending flat metal pads. This bump allows extension metal contact pins 60 to reach reverse-side metal contact pins 52 which are recessed in pin substrate 50 of the connector.

Extension metal contact pins 60 are mounted on a small, pivoting substrate 67 that is connected to or part of mechanical switch 57. A bend or bump near the socket-opening end of mechanical switch 57 is depressed by a connecter inserted into the socket opening. As mechanical switch 57 is depressed, one end of pivoting substrate 67 is pushed downward, causing extension metal contact pins 60 to pivot downward. Extension metal contact pins 60 do not make contact with metal cover 53 when mechanical switch 57 is depressed. This pivoting caused by mechanical switch 57 prevents extension metal contact pins 60 from shorting to the metal cover on a standard USB connector, as shown in FIG. 6H.

A cavity is formed by the bottom surface of pin substrate 64 and the top surface of lower substrate extension 65 and the back of pin substrate 64 that connects to lower substrate extension 65. The depth of this cavity can be the same or somewhat greater than the depth D2 of the prior-art USB socket of FIG. 3B. Metal cover 58 is a metal tube that covers pin substrate 64 and lower substrate extension 65. Metal cover 53 of the USB connector fits in gaps 61 between metal cover 58 and the top and sides of pin substrate 64. Mounting pin 62 can be formed on metal cover 58 for mounting the extended USB socket to a PCB or chassis.

FIG. 6C shows the cavity-top and cavity-bottom surfaces of socket pin substrate 64. The cavity-top surface supports four metal contact pins 66. These four pins carry the prior-art USB differential signals, power, and ground, and make contact with metal contact pins 68 of the extended USB connector on the top surface of pin substrate 50, shown in FIG. 6D.

The extended USB connector has 8 reverse-side metal contact pins 52 on the bottom surface of pin substrate 50, arranged as shown in FIG. 6D. These make contact with extension metal contact pins 60, arranged as shown in FIG. 6C on lower substrate extension 65. These 8 extension pins carry extended signals, such as for PCI-Express.

The bottom surface of the plug's pin substrate 50 contains two notches 63 located near the outside back of the plug as shown in FIG. 6D (plug, bottom). These two notches 63 engage two mechanical switches 57 on the sides of pivoting substrate 67 that also holds extension metal contact pins 60 between mechanical switches 57.

Figure 6E:
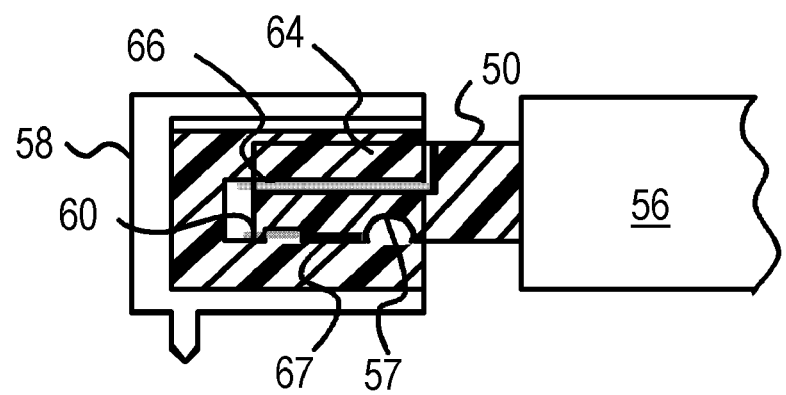

FIG. 6E shows the extended USB connector fully inserted into the extended USB socket. When fully inserted, the tip of pin substrate 50 fits into the cavity between pin substrate 64 and lower substrate extension 65 of the extended USB socket. On the upper surface of connector pin substrate 50, metal contact pins 68 make contact with the four metal contact pins 66 of socket pin substrate 64, while reverse-side metal contact pins 52 on the bottom surface of pin substrate 50 make contact with extension metal contact pins 60 on pivoting substrate 67 attached to the top surface of lower substrate extension 65.

As connector pin substrate 50 is inserted into the extended socket, mechanical switch 57 is initially pushed down by metal cover 53, depressing pivoting substrate 67 and extension metal contact pins 60. Once the plug is fully inserted into the socket, mechanical switches 57 fit into notches 63 and spring upward, causing extension metal contact pins 60 to make contact with reverse-side metal contact pins 52.

Figure 6F:
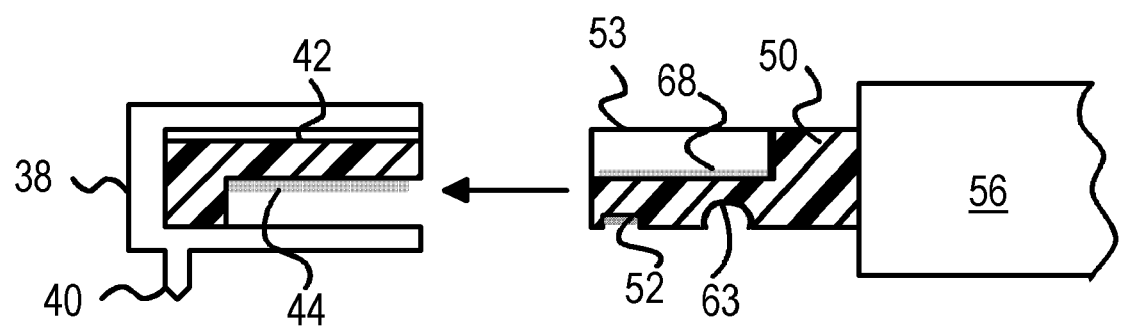

FIG. 6F shows the extended USB connector just before insertion into a standard USB socket. When fully inserted, the tip of pin substrate 50 fits under socket pin substrate 42. On the upper surface of connector pin substrate 50, metal contact pins 68 make contact with the four metal contact pins 44 of socket pin substrate 42. Reverse-side metal contact pins 52 on the bottom surface of pin substrate 50 do not make contact with socket metal cover 38 since reverse-side metal contact pins 52 are recessed into the bottom surface of connector pin substrate 50 and can have raised ribs to increase spacing to the metal cover's spring clips. Thus only the four standard USB pins (metal contact pins 44, 68) are electrically contacted.

Figure 6G:
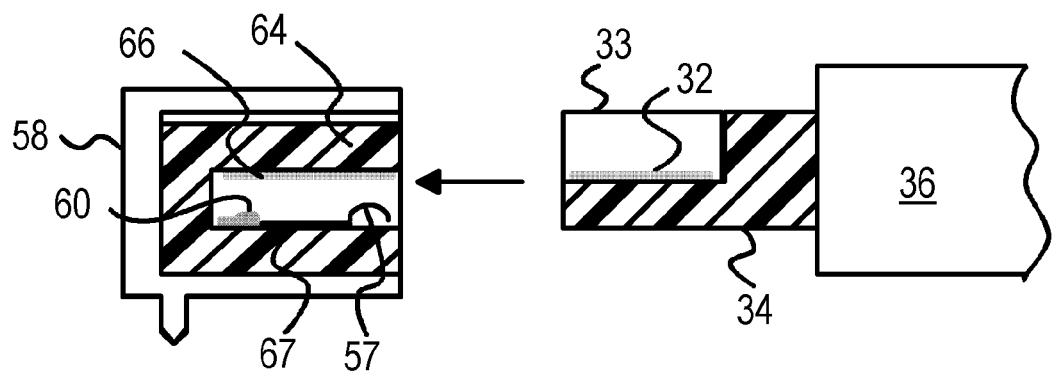
Figure 6H:
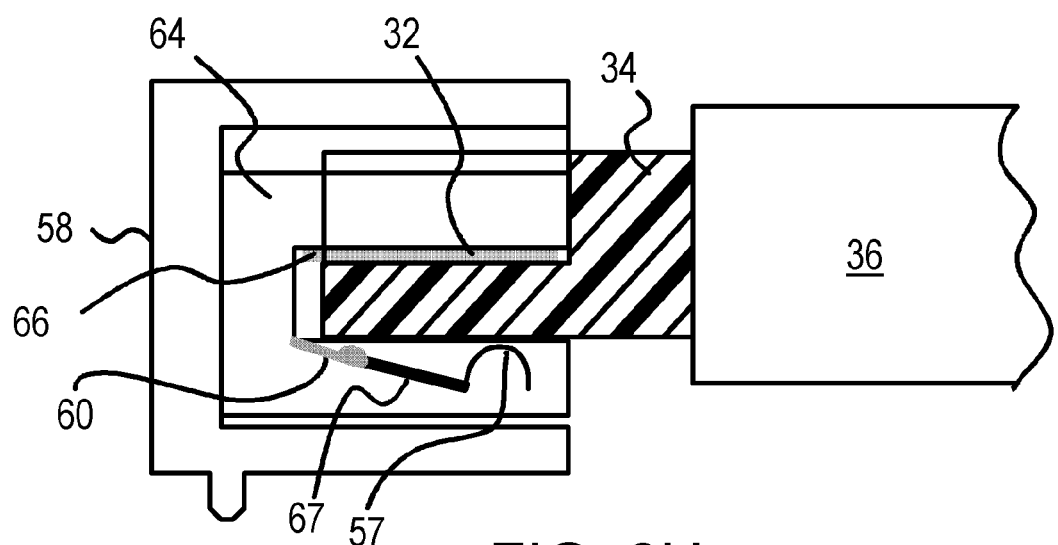

FIG. 6G shows a standard USB connector just before insertion into the extended USB socket. When fully inserted, as shown in FIG. 6H, the tip of connector pin substrate 34 fits under socket pin substrate 64, and reaches the back of the cavity. On the upper surface of connector pin substrate 34, metal contact pins 32 make contact with the four metal contact pins 66 of socket pin substrate 64.

Extension metal contact pins 60 on the top of lower substrate extension 65 do not touch connector metal cover 33 since they are pivoted downward by pivoting substrate 67 which has its socket-opening end pushed downward by mechanical switch 57. The bump on the top of mechanical switch 57 is pushed downward by metal cover 33 of the USB plug. Mechanical switch 57 can be made from an insulating material such as hard plastic, or can be made from metal but isolated from pivoting substrate 67 and from extension metal contact pins 60 to prevent shorting. Thus only the four standard USB pins (metal contact pins 32, 66) are electrically contacted.

Figure 7A:
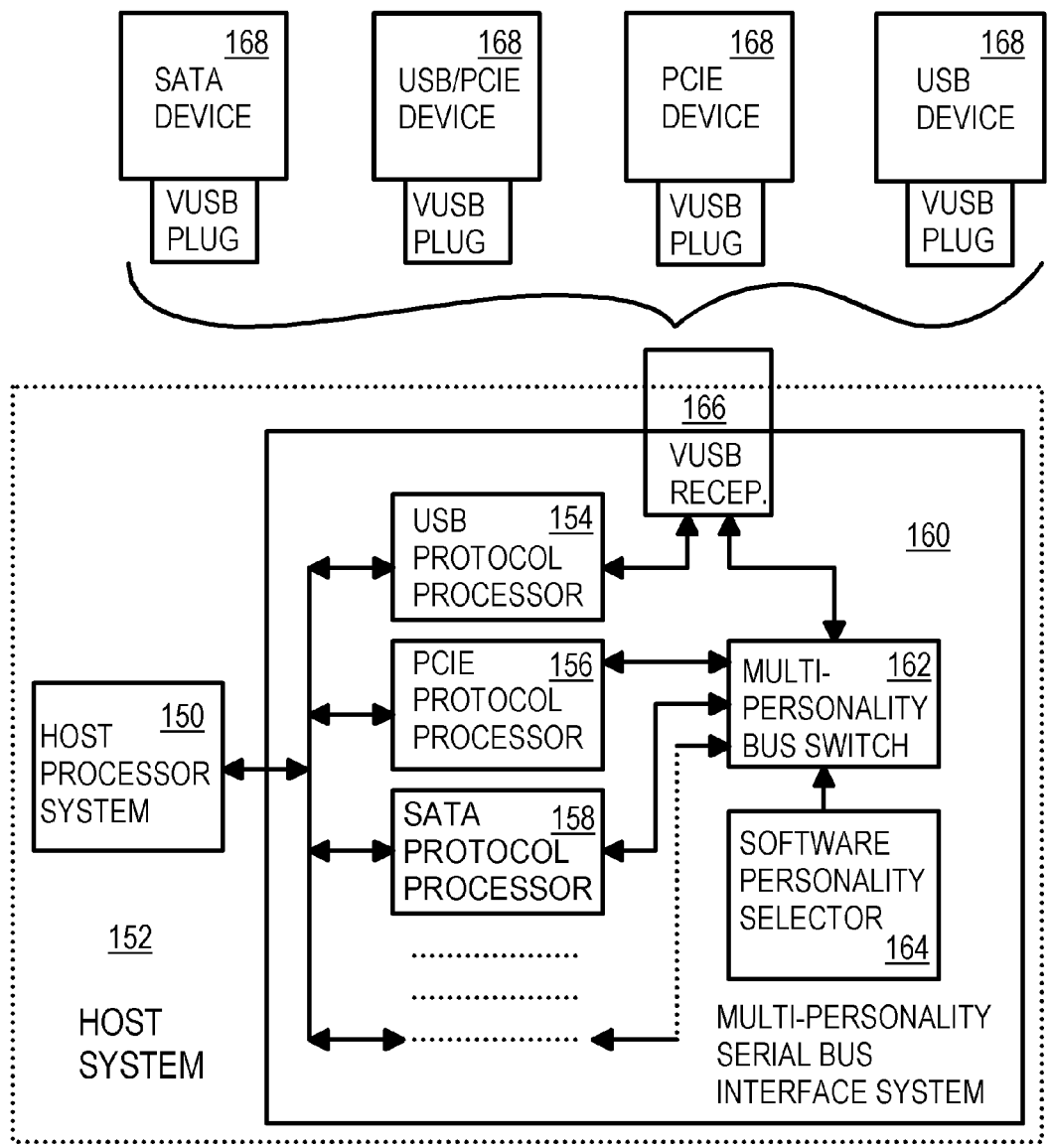
FIG. 7A is a block diagram of a host with an extended-USB socket that supports extended-mode communication.
Figure 7B:
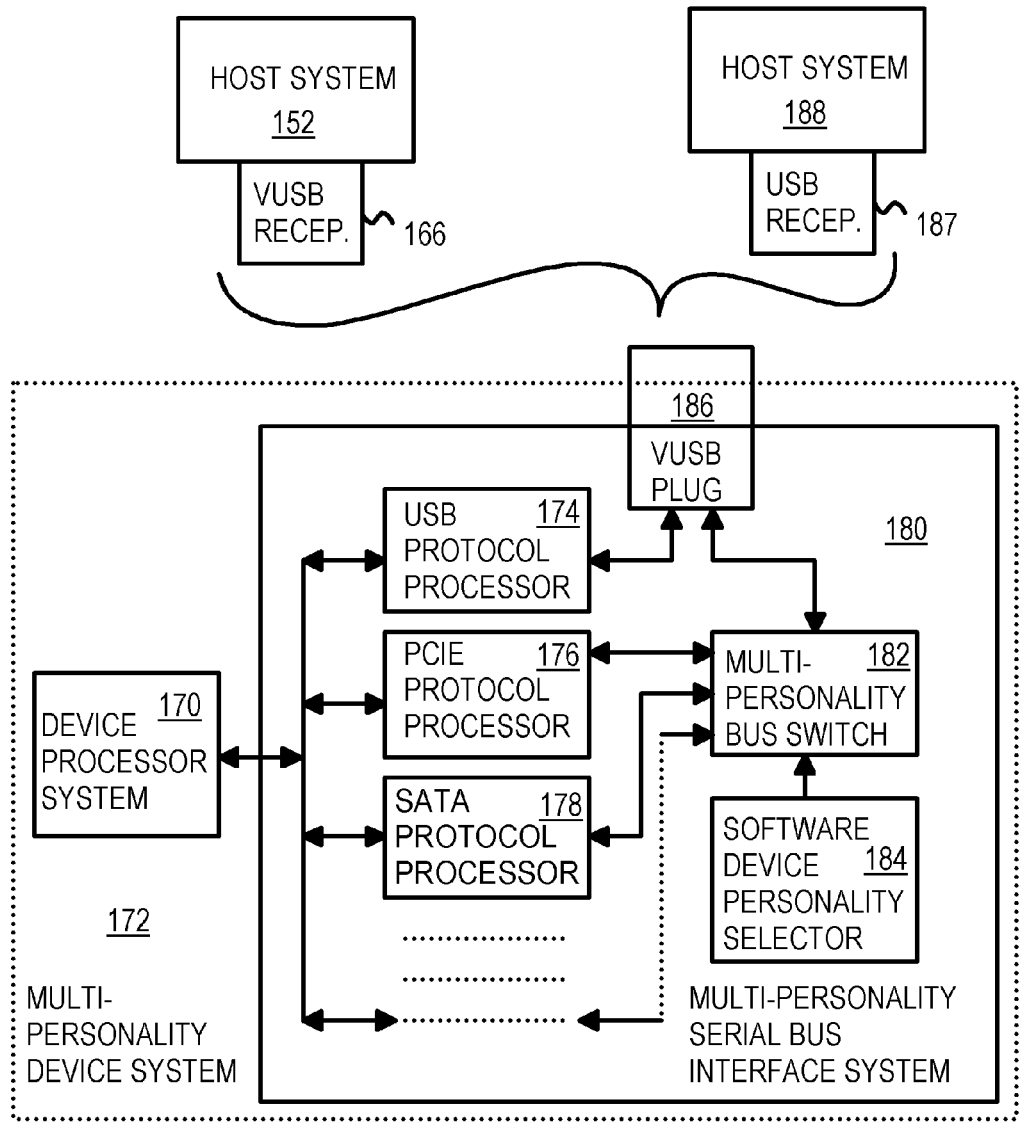
FIG. 7B is a block diagram of a peripheral with an extended-USB connector that supports extended-mode communication.

System Block Diagrams—FIGS. 7A–B

FIG. 7A is a block diagram of a host with an extended-USB socket that supports extended-mode communication. A variety of extended-USB or USB peripherals 168 could be plugged into extended-USB socket 166 of host 152. For example, a SATA peripheral, a PCI-Express peripheral, a Firewire IEEE 1394 peripheral, a Serial-Attached SCSI peripheral, or a USB-only peripheral could be inserted. Each can operate in its own standard mode.

Host 152 has processor system 150 for executing programs including USB-management and bus-scheduling programs. Multi-personality serial-bus interface 160 processes data from processor system 150 using various protocols. USB processor 154 processes data using the USB protocol, and inputs and outputs USB data on the USB differential data lines in extended USB socket 166.

The extended metal contact pins in extended USB socket 166 connect to multi-personality bus switch 162. Transceivers in multi-personality bus switch 162 buffer data to and from the transmit and receive pairs of differential data lines in the extended metal contacts for extended protocols such as PCI-Express, Firewire IEEE 1394, Serial-Attached SCSI, and SATA. When an initialization routine executed by processor system 150 determines that inserted peripheral 168 supports SATA, personality selector 164 configures multi-personality bus switch 162 to connect extended USB socket 166 to SATA processor 158. When the initialization routine executed by processor system 150 determines that inserted peripheral 168 supports PCI-Express, personality selector 164 configures multi-personality bus switch 162 to connect extended USB socket 166 to PCI-Express processor 156. Then processor system 150 communicates with either PCI-Express processor 156 or SATA processor 158 instead of USB processor 154 when extended mode is activated.

FIG. 7B is a block diagram of a peripheral with an extended-USB connector that supports extended-mode communication. Multi-personality peripheral 172 has extended USB connector 186 that could be plugged into extended-USB socket 166 of host 152 that has extended-mode communication capabilities such as SATA, 1394, SA-SCSI, or PCI-Express. Alternately, extended USB connector 186 of multi-personality peripheral 172 could be plugged into standard-USB socket 187 of host 188 that only supports standard USB communication.

Multi-personality peripheral 172 has processor system 170 for executing control programs including USB-peripheral-control and response programs. Multi-personality serial-bus interface 180 processes data from processor system 170 using various protocols. USB processor 174 processes data using the USB protocol, and inputs and outputs USB data on the USB differential data lines in extended USB connector 186.

The extended metal contact pins in extended USB connector 186 connect to multi-personality bus switch 182. Transceivers in multi-personality bus switch 182 buffer data to and from the transmit and receive pairs of differential data lines in the extended metal contacts for extended protocols such as PCI-Express, 1394, SA SCSI, and SATA. When a control or configuration routine executed by processor system 170 determines that host 152 has configured multi-personality peripheral 172 for SATA, personality selector 184 configures multi-personality bus switch 182 to connect extended USB connector 186 to SATA processor 178. When the initialization routine executed by processor system 170 determines that inserted peripheral 188 supports PCI-Express, personality selector 184 configures multi-personality bus switch 182 to connect extended USB connector 186 to PCI-Express processor 176. Then processor system 170 communicates with either PCI-Express processor 176 or SATA processor 178 instead of USB processor 174 when extended mode is activated.

If a PCI Express device with an extended USB plug is plugged into a host system with a conventional USB receptacle, nothing will be recognized if the PCI Express device does not support USB. The host system will not see anything that has plugged into the system. The same is true for a SATA-only device, etc.

Figure 8:
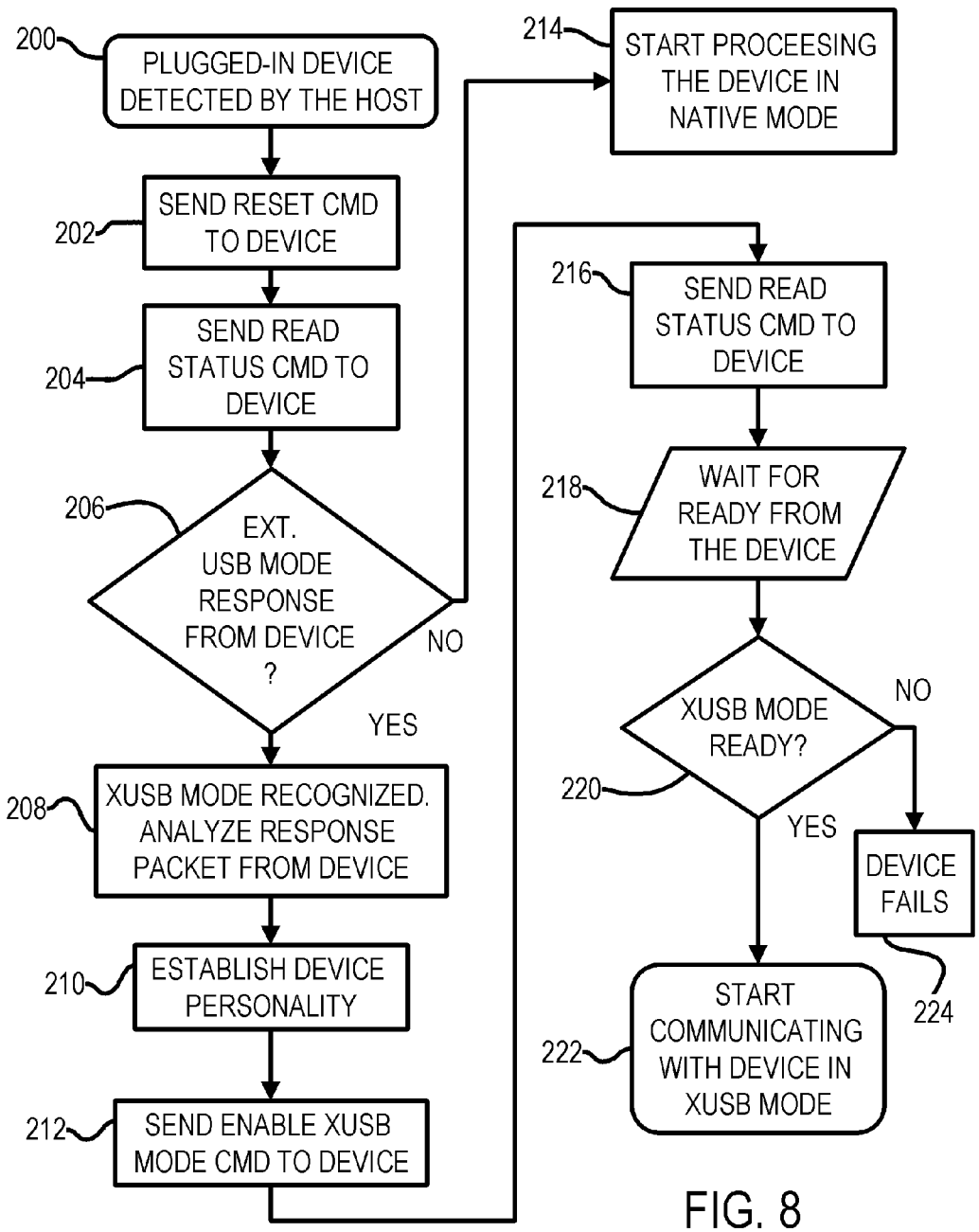
FIG. 8 is a flowchart of an initialization routine executed by a host for detecting a device plugged into an extended USB socket.
Figure 9:
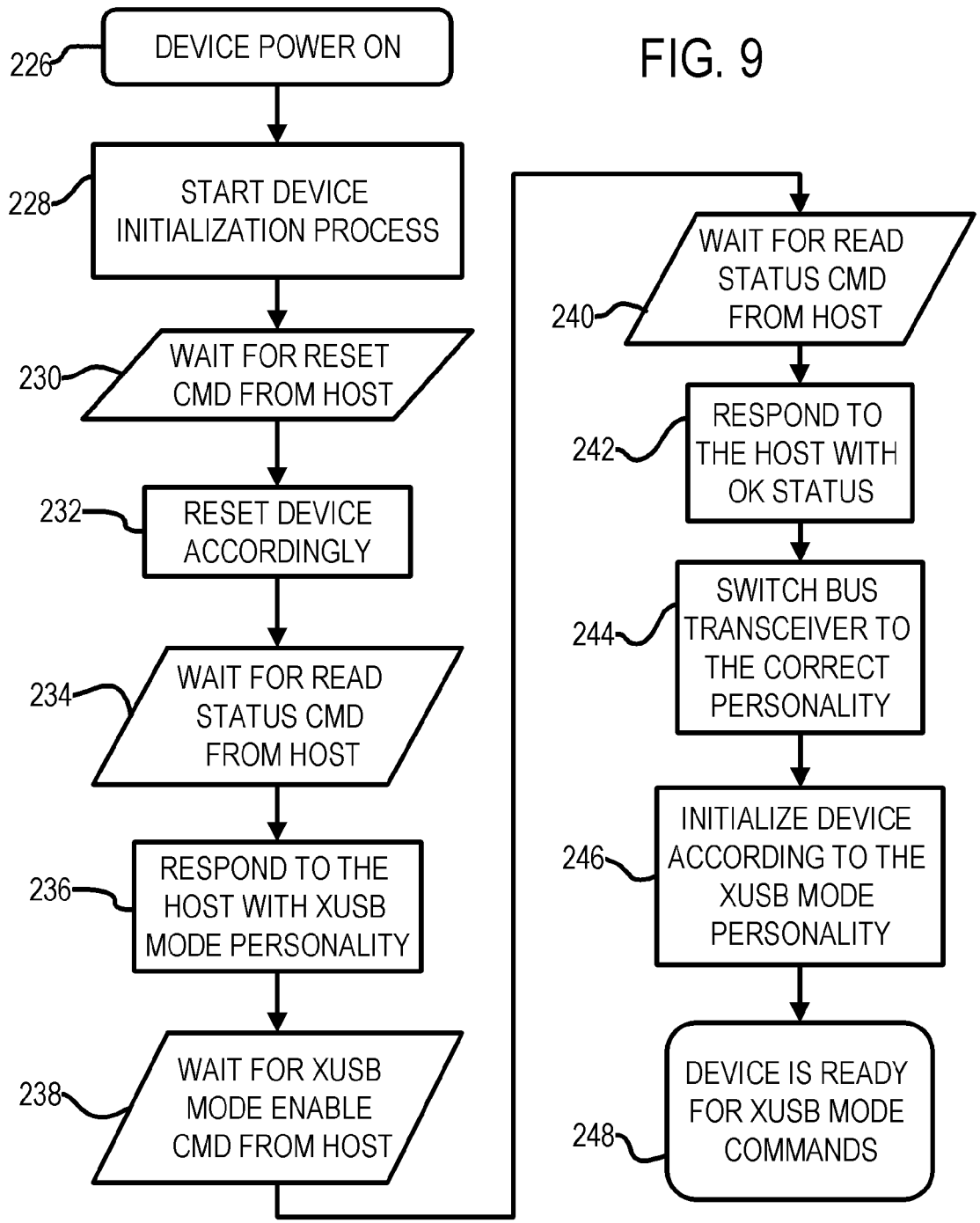
FIG. 9 is a flowchart of an initialization routine executed by a peripheral device plugged into an extended USB socket.

Flowcharts—FIGS. 8–9

FIG. 8 is a flowchart of an initialization routine executed by a host for detecting a device plugged into an extended USB socket. A host such as a PC can have an extended USB socket. Either an extended USB device, or a standard USB device can be plugged into the extended USB socket. This routine detects whether the inserted device supports extended-USB mode or only standard USB mode. The routine may be executed by processor system 150 of FIG. 7A.

The host detects a newly-inserted device plugged into the extended USB socket, step 200, such as by detecting resistance changes on the metal contact pins of the extended USB socket. When the newly-inserted device is detected, a USB reset command is sent over the USB differential signal lines to the device, step 202. A USB read-status command is then sent by the host, step 204.

The peripheral device responds by sending its status information using USB protocols. The host examines this status information, and in particular looks for a mode identifier indicating that the peripheral supports extended-USB mode. This mode identifier can be a status bit or a unique code in an area reserved for use by the peripheral vendor to identify the peripheral's type or capabilities.

When the peripheral responds with a status indicating no extended-USB support, step 206, then processing continues in native USB mode, step 214. Standard USB transactions are performed between the host and the peripheral using the differential USB data pins in the four-pin side of the extended USB socket. The peripheral likely has a standard USB connector that has only 4 metal contact pins, not the extension with the 8 additional metal contact pins.

When the peripheral responds with a status indicating extended-USB support, step 206, then the host further examines the packet from the peripheral to determine that the peripheral can support higher-speed communication using the extended metal contact pins, step 208. The peripheral has an extended USB connector with the 8 additional metal contact pins in an extension portion of the connector.

The host can further examine the capabilities of the peripheral, such as to determine which extended modes are supported, step 210. Some peripherals may support PCI-Express communication in extended mode, while others support Serial-ATA, Serial Attached SCSI, or IEEE 1394 as the extended-mode protocol.

The host then sends a vendor-defined USB OUT command to the peripheral, step 212. This command instructs the peripheral to activate its extended mode of operation. The host verifies that the device received the command by reading its status again, step 216. The peripheral responds with a ready status, step 218. If the status read back from the device does not indicate that the peripheral is ready to switch to extended mode, step 220, then the device fails, step 224. The host could fall back on standard USB mode, step 214, or attempt again to activate extended mode, step 202. After trying a predetermined number of times, the host falls back on standard USB mode, step 214.

When the peripheral responds with the correct ready, step 220, then the host and peripheral can begin communicating in the extended mode. The 8 additional metal contact pins in the extended portion of the USB connector and socket are used for communication rather than the 4 USB metal contact pins. For example, the PCI-Express transmit and receive differential pairs can be used to bi-directionally send and receive data when the device has a PCI-Express personality. The host uses these extended pins to send a read-status command to the peripheral, step 222. Data can be sent and received at the higher rates supported by PCI-Express rather than the slower USB rates.

FIG. 9 is a flowchart of an initialization routine executed by a peripheral device plugged into an extended USB socket. A peripheral can have an extended USB connector that can be plugged into either an extended USB socket or a standard USB socket. This routine executes on the peripheral device and helps the host detect that the inserted device supports extended-USB mode. The routine may be executed by peripheral-device processor system 170 of FIG. 7B.

When the peripheral device is plugged into the USB socket, power is received though the power and ground pins on the 4-pin USB portion of the connector, step 226. The peripheral device executes any initialization procedures to power itself up, step 228, and waits for a reset command from the host, step 230. Once the reset command is received from the host, the peripheral device resets itself, step 232.

The peripheral device waits for further commands from the host, step 234, such as a read-status command. The status read by the host, or further data read by the host can contain capability information about the peripheral device, such as which extended modes are supported, PCI-Express, SATA, IEEE 1394, SA SCSI, etc., step 236. The reset and read-status commands are standard USB commands from the host.

The peripheral device then waits for a command from the host to enable extended-mode communication, step 238. An enable command followed by another read-status command must be received, so the peripheral waits for the read-status command, step 240. Once the read-status command is received, the peripheral responds with an OK or READY status to indicate that it is ready to switch to using the extended metal contact pins on the connector, step 242.

Then the peripheral device switches its bus transceivers to match the bus-protocol specified by the host to be able to communicate over the 8 extension metal contact pins, step 244. The 4 USB metal contact pins are not used. The peripheral device waits for a read-status command sent by the host over the extended metal contact pins and responds to this read-status command, step 246, initializing for the new protocol mode. The peripheral device can then receive extended commands such as PCI-Express commands that are received over the extended metal contact pins on the extended portion of the connector, such as the PCI-Express transmit and receive differential lines, step 248.

FIG. 10 is a table of extended and standard pins in the extended USB connector and socket. The A side of the pin substrates contains the four standard USB signals, which include a 5-volt power signal and ground. The differential USB data D−, D+ are carried on pins 2 and 3. These pins are not used for extended modes.

Side B of the pin substrates, or the extension of the primary surfaces, carries the extended signals. Pin 1 is a 3.3-volt power signal for PCI-Express, Serial-ATA, and IEEE1394, while pin 2 is a 1.5-volt supply for PCI-Express and reserved for others. Pin 8 is a 12-volt power supply for SATA, and IEEE1394 and reserved for PCI-Express. Pin 5 is a ground.

Pins 3 and 4 carry the transmit differential pair, called PETn, PETp, for PCI-Express, T−, T+ for SATA, and the B differential pair, TPB*, TPB, for IEEE 1394. Pins 6 and 7 carry the receive differential pair, called PERn, PERp, for PCI-Express, R−, R+ for SATA, and the A differential pair, TPA*, TPA, for IEEE 1394.

The ExpressCard pins REFCLK+, REFCLK−, CPPE#, CLKREQ#, PERST#, and WAKE# are not used in the extended USB connector to reduce the pin count. Additional pins could be added to the extended USB connector and socket if some or all of these pins are desired.

Alternate Embodiments

Several other embodiments are contemplated by the inventors. For example, a variety of materials may be used for the connector substrate, circuit boards, metal contacts, metal case, etc. Plastic cases can have a variety of shapes and may partially or fully cover different parts of the circuit board and connector, and can form part of the connector itself. Various shapes and cutouts can be substituted. Pins can refer to flat metal leads or other contactor shapes rather than pointed spikes. The metal cover can have the clips and slots that match prior-art USB connectors.

Rather than use PCI-Express, the extended USB connector/socket can use serial ATA, Serial Attached SCSI, or Firewire IEEE 1394 as the second interface. The host may support various serial-bus interfaces as the standard interface, and can first test for USB operation, then IEEE 1394, then SATA, then SA SCSI, etc., and later switch to a higher-speed interface such as PCI-Express. During extended mode when the 8 extended contact are being used for the extended protocol, the 4 USB contacts can still be used for USB communication. Then there are two communication protocols that the host can use simultaneously.

In the examples, USB series A plugs and receptacles are shown. However, the invention is not limited to Series A.

Series B, Series mini-B, or Series mini-AB can be substituted. Series B uses both upper and lower sides of the pin substrate for the USB signals. The left-side and right-side of the pin substrate can be used for the additional 8 pins. Series mini-B and Series mini-AB use the top side of the pin substrate for the USB signals. The additional 8 pins can be placed on the bottom side of the pin substrate 34 for these types of connectors. The extended USB connector, socket, or plug can be considered a very-high-speed USB connector or VUSB connector since the higher data-rates of PCI-Express or other fast-bus protocols are supported with a USB connector.

A special LED can be designed to inform the user which electrical interface is currently in use. For example, if the standard USB interface is in use, then this LED can be turned on. Otherwise, this LED is off. If more than 2 modes exists, then a multi-color LED can be used to specify the mode, such as green for PCI-Express and yellow for standard USB.

The pivoting substrate 67 can pivot along a hinge or other connection at the back of the socket, or can have a spring or springs under it that are depressed, causing the pivoting substrate 67 to move downward in a more parallel and less pivoting manner. Other variations and exact implementations are possible.

The longer metal contact pins on the edges can be used to carry ground, while the shorter metal contact pins in the middle can be used to carry power and other signals, such as shown in FIGS. 4D, 6D (top). The longer metal contact pins make contact first, allowing ground to be connected before power. This improves hot-plug reliability.

Applications can include flash drives, USB connectors on desktop computers, notebook computers, Pocket PCs, Handy Terminals, Personal Communicators, PDA's, digital cameras, cellular phones with or without digital cameras, TV set-top boxes, MP3, MPEG4, copiers, printers, and other electronic devices. Such devices may use to advantage the higher speed offered by the extended modes of the extended USB connectors and sockets, and may reduce size and space together with lower cost compared with larger card-type or dual-plug connectors. Legacy USB devices and hosts are supported, so the extended hosts and peripherals can freely operate with other legacy peripherals and hosts using standard USB mode.

Additional metal contacts can be added to the new connectors and sockets. These additional metal contacts can serve as power, ground, and/or I/O pins which are further extensions to the USB specification, or PCI Express or other specifications. Greater power capability can be obtained with (or without) additional power and ground pins (or by a higher power supply current of the existing power pin). Multiple power supplies can also be provided by the additional power and ground pins. The improved power supply capabilities allow more devices and/or more memory chips to be powered.

Extra I/O pins can be added for higher bandwidth and data transfer speeds. The additional I/O pins can be used for multiple-bit data I/O communications, such as 2, 4, 8, 12, 16, 32, 64, . . . bits. By adopting some or all of these new features, performance of hosts and peripheral devices can be significantly improved. These additional pins could be located behind or adjacent to the existing USB pins, or in various other arrangements. The additional pins could be applied to male and female connector.

To reduce the number of extended pins, the four original USB pins can be shared. One embodiment has a total of 10 pins. Two of the differential signal pins for PCI-Express, Serial-ATA, and IEEE 1394 can be shared with the 2 differential data pins of USB. The same scheme can be applied to the ExpressCard connector. There is no change for the 4 pins related to USB. For the PCI Express signals, only PETn, PETp, PERn and PERp need to be modified to include the corresponding signals for 1394, SATA and SASCSI. Other PCI-related signals can be mapped also.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An extended Universal-Serial-Bus (USB) connector plug for insertion into an extended USB socket or into a standard USB socket, the extended USB connector plug comprising:
   an extended pin substrate that has an extended length that is longer than or equal to a standard length of the pin substrate of the standard USB connector plug;
   plug standard metal contact pins on the pin substrate, wherein when the standard pin substrate of the extended USB connector plug is inserted into a cavity of the standard USB socket, the standard metal contact pins make physical and electrical contact with plug standard metal contact pins on a plug pin substrate;
   plug extended metal contact pins on the extended pin substrate;
   wherein when the extended pin substrate of the extended USB connector plug is inserted into a cavity of the extended USB socket, the plug extended metal contact pins on the extended pin substrate make physical and electrical contact with socket extended metal contact pins on the extended USB socket;
   a set of ribs on the extended pin substrate, adjacent to the plug extended metal contact pins of the extended USB connector plug;
   wherein set of ribs prevents the plug extended metal contact pins from making contact with a standard metal cover when the extended USB connector plug is inserted into the standard USB socket with the standard metal cover,
   whereby the set of ribs prevents shorting to the standard metal cover of the standard USB socket and whereby the plug extended metal contact pins make contact when the extended USB connector plug is inserted into the extended USB socket, but do not make contact when inserted into the standard USB socket.

2. The extended USB connector plug of claim 1 wherein the plug extended metal contact pins are recessed into the extended pin substrate of the extended USB connector plug,
wherein the plug extended metal contact pins do not make contact to a standard metal cover when the extended USB connector plug is inserted into the standard USB socket with the standard metal cover,
whereby recessing the plug extended metal contact pins prevents shorting to the standard metal cover of the standard USB socket.

3. The extended USB connector plug of claim 1
wherein the plug standard metal contact pins carry standard USB signals during an initialization phase after insertion that includes a switch command sequence to switch to an extended mode;
wherein the plug extended metal contact pins carry extended-mode signals after the switch command sequence is sent over the plug standard metal contact pins
wherein the extended-mode signals are PCI-Express signals. Serial-AT-Attachment signals, Serial Attached Small-Computer System Interface (SCSI), or IEEE 1394 signals.

4. The extended USB connector plug of claim 1 wherein the plug extended metal contact pins comprise 8 pins;
wherein the plug standard metal contact pins comprise 4 pins.

5. The extended USB connector plug of claim 1 wherein the plug extended metal contact pins comprise a single row of pins or two rows of pins.

6. A dual-personality connector plug comprising:
a housing for gripping by a user when inserting into a standard socket or into a dual-personality socket, the housing having wires passing there-through;
a pin substrate made from non-conducting material, extending outward from the housing along an insertion axis;
a metal cover, extending outward from the housing and wrapping around the pin substrate with sides parallel to the insertion axis and an opening perpendicular to the insertion axis at an end opposite the housing;
wherein the pin substrate has an insertable portion near the opening, wherein the insertable portion is for inserting into the standard socket or into the dual-personality socket;
plug standard metal contacts formed on a first surface of the insertable portion of the pin substrate, the plug standard metal contacts connected to the wires passing through the housing; and
plug extended metal contacts formed on the insertable portion of the pin substrate, the plug extended metal contacts connected to the wires passing through the housing;
wherein the plug extended metal contacts do not electrically contact a metal cover or socket metal contacts of the standard socket when inserted, but the plug standard metal contacts make electrical contact with socket metal contacts of the standard socket when inserted;
wherein the plug extended metal contacts electrically contact socket metal contacts of the dual-personality socket when inserted, and the plug standard metal contacts make electrical contact with socket metal contacts of the standard socket when inserted.

7. The dual-personality connector plug of claim 6 wherein the plug extended metal contacts are formed on a second surface opposite the first surface of the insertable portion of the pin substrate, the plug extended metal contacts being recessed into the second surface so that the plug extended metal contacts do not electrically contact the metal cover of the standard socket when inserted.

8. The dual-personality connector plug of claim 6 wherein the plug extended metal contacts are formed on a second surface opposite the first surface of the insertable portion of the pin substrate;
wherein the second surface is a moveable surface that retracts when the insertable portion is inserted into the standard socket.

9. The dual-personality connector plug of claim 6 wherein the plug extended metal contacts are also formed on the first surface of the insertable portion of the pin substrate, the plug extended metal contacts being located farther from the opening than the plug standard metal contacts.

10. The dual-personality connector plug of claim 6 wherein the standard socket is a Universal-Serial-Bus (USB) socket and wherein the plug extended metal contacts carry PCI-Express signals, serial ATA signals, Serial Attached Small-Computer System Interface (SCSI), or Firewire IEEE 1394 signals.

11. The dual-personality connector plug of claim 6 wherein the plug standard metal contacts carry standard Universal-Serial-Bus (USB) signals during an initialization phase after insertion tat includes a switch command sequence to switch to an extended mode;
wherein the plug extended metal contacts carry extended-mode signals after the switch command sequence is sent over the plug standard metal contacts.

12. The dual-personality connector plug of claim 11 wherein the extended-mode signals comprise a transmit differential pair and a receive differential pair that each carry uni-directional signals, while the standard USB signals comprise a single differential pair that carried bi-directional data.

* * * * *